(12) United States Patent
Cobian

(10) Patent No.: US 7,109,976 B2
(45) Date of Patent: *Sep. 19, 2006

(54) DISPLAY SCREEN SEAL

(75) Inventor: Paul J. Cobian, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 534 days.

This patent is subject to a terminal disclaimer.

(21) Appl. No.: 10/404,465

(22) Filed: Apr. 1, 2003

(65) Prior Publication Data

US 2004/0212583 A1    Oct. 28, 2004

(51) Int. Cl.
G09G 5/00    (2006.01)

(52) U.S. Cl. ........................................ 345/173; 361/816

(58) Field of Classification Search ........ 345/173–183; 349/153, 190; 361/816, 826, 800
See application file for complete search history.

(56) References Cited

U.S. PATENT DOCUMENTS

| 4,771,277 | A |  | 9/1988  | Barbee et al. |  |
|---|---|---|---|---|---|
| 4,779,025 | A | * | 10/1988 | Paynton et al. | 313/478 |
| 5,038,142 | A |  | 8/1991  | Flowers et al. |  |
| 5,332,238 | A | * | 7/1994  | Borucki | 277/654 |
| 5,579,036 | A | * | 11/1996 | Yates, IV | 345/173 |
| 5,805,251 | A | * | 9/1998  | Ozawa | 349/110 |
| 5,847,690 | A | * | 12/1998 | Boie et al. | 345/104 |
| 5,854,625 | A |  | 12/1998 | Frisch et al. |  |
| 6,034,672 | A | * | 3/2000  | Gaultier et al. | 345/173 |
| 6,269,537 | B1 | * | 8/2001  | Kimura et al. | 29/832 |
| 6,784,875 | B1 | * | 8/2004  | Yuen | 345/173 |
| 2002/0149571 | A1 |  | 10/2002 | Roberts |  |

FOREIGN PATENT DOCUMENTS

| WO | WO 02/084244 A2 | 10/2002 |
|---|---|---|
| WO | WO 02/084578 A2 | 10/2002 |
| WO | WO 02/084579 A2 | 10/2002 |
| WO | WO 02/084580 A2 | 10/2002 |

OTHER PUBLICATIONS

U.S. Appl. No. 10/365,654, filed Feb. 12, 2003, Sealed Force-Based Touch Sensor.

* cited by examiner

Primary Examiner—Richard Hjerpe
Assistant Examiner—Kevin M. Nguyen
(74) Attorney, Agent, or Firm—Robert J. Pechman

(57) ABSTRACT

The present invention provides a display screen seal made of a rigid or semi-rigid material that includes a base having first and second surfaces, and a wall portion extending from the second surface. The base is configured to mount to the screen and be positioned between the screen and a structure residing adjacent the screen, such as a bezel or frame of the display, so that the wall portion inhibits foreign objects from passing between the screen and the adjacent structure.

32 Claims, 3 Drawing Sheets

DISPLAY SCREEN SEAL

BACKGROUND OF THE INVENTION

1. Field of Invention

The present invention relates to seals for display screens and, more particularly, to seals for force-based touch device displays.

2. Related Art

The popularity of touch screens has increased significantly over the past several years. Many different technologies have been explored in an effort to produce a high-quality touch sensor that is reliable and cost effective. Examples of touch sensor technologies include capacitive, resistive, near field imaging (NFI), acoustical wave, infrared, and force. Common applications for touch sensors include computer monitors and mobile and handheld devices, such as personal digital assistants (PDAs).

Touch sensors typically possess features and qualities that are unique for a given technology. Each type of touch sensor technology presents specific challenges related to, for example, the recognition of a touch input, the determination of the position of a touch input to a touch sensitive structure of the sensor, reliability, size, weight, and cost. The requirements for force-based touch sensors present their own set of challenges for attaining a viable and reliable touch system. One feature that is particularly unique to some force-based touch technologies is the desirability for the touch surface to be movable relative to the frame and bezel of the device so that the displacement can be measured as indicative of the applied touch force. Known sealing methods and structures, when applied between the movable screen and the frame and bezel, introduce a sufficient amount of extraneous force input to the touch system that may adversely affect touch input measurements.

In order to create a seal, many touch sensitive applications use the device bezel to press firmly around the edges of a touch-equipped display screen or display overlay module. This arrangement provides a dust and/or liquid seal, and may also serve to stiffen and align the bezel. With force-based touch devices, it may be desirable that the bezel and/or frame of the device not rest directly against the display screen, since the variable handling forces transmitted to the screen when touching the bezel and/or frame can interfere with touch location accuracy.

Another challenge for many touch sensors relates to how they are mounted to a display device. It is common practice to retrofit existing display devices with a touch sensitive system rather than to create a unique display device design that addresses the specific needs of a touch sensitive sensor. It is also common for some manufactures of touch sensitive display devices, for example, display devices with resistive and capacitive touch systems, to use a precalibrated, self-contained touch system that can be dropped into an existing display device. Such self-contained touch systems provide some advantages such as increased ease in assembling the display device, and improved quality control because the self-contained touch system can be tested by the sensor manufacture prior to being mounted to the display device.

SUMMARY OF THE INVENTION

In one of its aspects, the present invention provides a display screen seal that includes a base having first and second surfaces, and a wall portion extending from the second surface. The first surface of the base is configured for engaging a display screen, and the second surface of the base faces in a direction away from the display screen. The wall portion is configured for inhibiting foreign objects from passing between the screen and a structure positioned adjacent the screen.

Another aspect of the invention includes a method of inhibiting foreign objects from entering between a touch sensitive surface of a display screen and a structure positioned adjacent the touch sensitive surface. According to the method, a wall seal is provided having a base with opposing first and second surfaces, and a wall portion extending from the second surface. The base extends between the adjacent structure and the touch sensitive surface. The wall portion is positioned adjacent the structure, and the first surface of the base is secured to the touch sensitive surface to inhibit foreign objects from passing along a plane of the touch screen between the display screen and the structure.

In another aspect of the invention, a force-based touch sensor assembly includes a frame, a screen having inner and outer surfaces, a wall seal for inhibiting passage between the frame and the screen, and a force activated transducer positioned adjacent the screen for detecting forces pushing through the screen due to a touch input. The wall seal includes a base having first and second surfaces and first and second sides, with the first surface capable of being mounted to the screen, and a wall portion extending from the second surface in a direction away from the screen. The wall seal is configured and arranged so that mounting the wall seal to the screen with the wall portion positioned adjacent the frame inhibits passage of objects between the frame and the screen.

A yet further aspect of the invention is directed to a self-contained force-based touch sensor assembly. The assembly includes a frame having inner and outer surfaces, a screen having inner and outer surfaces, a transducer positioned to sense forces passing through the screen due to touch inputs on the screen, and a spring positioned between the inner surface of the frame and the screen to exert a pre-load force between the screen and the transducer. A wall seal of the assembly includes a base with first and second surfaces and a wall portion extending from the second surface. The first surface of the base is mounted to the outer surface of the screen and positioned between the inner surface of the frame and the outer surface of the screen. The wall portion of the wall seal is positioned adjacent the frame.

A yet further aspect of the invention relates to a method of assembling a force-based touch sensor assembly. The assembly includes a frame, a screen having first and second surfaces, and a wall seal having a base with first and second surfaces and a wall portion extending from the second surface. The method includes the steps of retaining the screen within boundaries of the frame, securing the first surface of the wall seal to the screen, and positioning the wall portion adjacent to the frame. The wall seal, when mounted to the screen with the wall portion adjacent the frame, is capable of inhibiting passage of foreign objects between the frame and screen to an area between the frame and the inner surface of the screen.

DETAILED DESCRIPTION OF THE PREFERRED EMBODIMENT

In one of its aspects, the invention provides a novel display screen seal. As described in more detail below, the membrane may be implemented into a display system in a very simple, cost effective way that is easy to manufacture and is widely applicable for a variety of different touch-related applications. In particular, the membrane of the present invention may be used in computer monitors, mobile and handheld devices, and industrial applications that require touch technology. The wall seal of the present invention is particularly useful in force-based touch sensitive devices that include a force sensitive structure that is free to move relative to a housing of the sensor assembly. The wall seal may be generally configured to form an obstruction between at least one surface of the sensor assembly screen and a portion of the sensor assembly housing so as to prohibit, or at least inhibit foreign objects from entering between the screen and the housing.

A force-based touch sensor assembly typically requires a frame that houses and mounts a touch sensitive structure that has a touch sensitive surface. One example of a touch sensitive structure is a sensor screen ("screen") with one primary surface of the screen that acts as a touch sensitive surface ("touch surface"). Typically, some type of force-activated sensor or transducer is positioned between the frame and the screen to sense forces passing through the screen due to touch inputs to the screen, measure those forces, and determine the location of the touch input with desired accuracy. In order to determine a touch input location, the display screen should be in constant contact with the sensors, which are typically spaced around a periphery of the screen. Also, the screen as a whole is preferably isolated sufficiently from extraneous forces that the effects of such forces on the force surface is less than a minimum threshold for input force. Extraneous forces in excess of a threshold amount may cause inaccuracies in determining an intended touch input, which would result in a touch sensor that does not work properly.

Exemplary force-based touch sensor assemblies may include some type of biasing member to apply a proper preload force to the screen to hold the screen against the sensors, while allowing the screen to move so as to be sensitive to intended touch inputs. Examples of such force-based displays are disclosed herein and further disclosed in pending applications WO 02/084244, WO 02/084578, WO 02/084579, and WO 02/084580, which are each incorporated herein by reference in their entirety.

Figure 1:
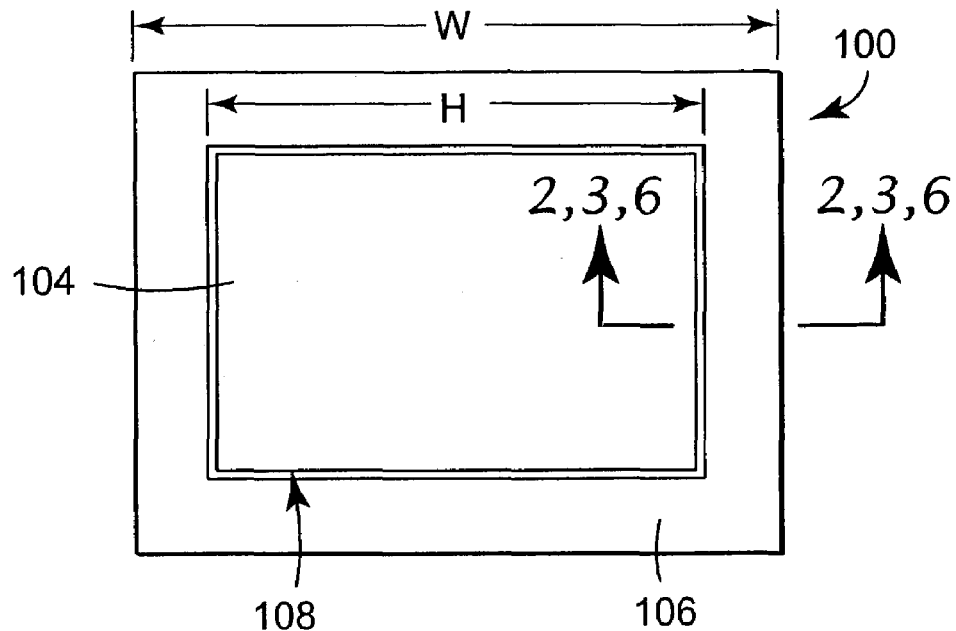
FIG. 1 is a front plan view of a display assembly including one example of a display screen seal according to principles of the invention.

One example of a display assembly ("display") illustrating principles of the present invention is display 100 shown in FIG. 1. Display 100 includes a bezel 106 and a force-based touch sensor assembly that includes a touch sensitive structure 104, a wall seal 108, a transducer (not shown), and a frame (not shown). Although wall seal 108 is visible from the front view of the display shown in FIG. 1, in some embodiments wall seal 108 may be recessed underneath bezel 106 so as to be hidden from a front view.

Figure 2:
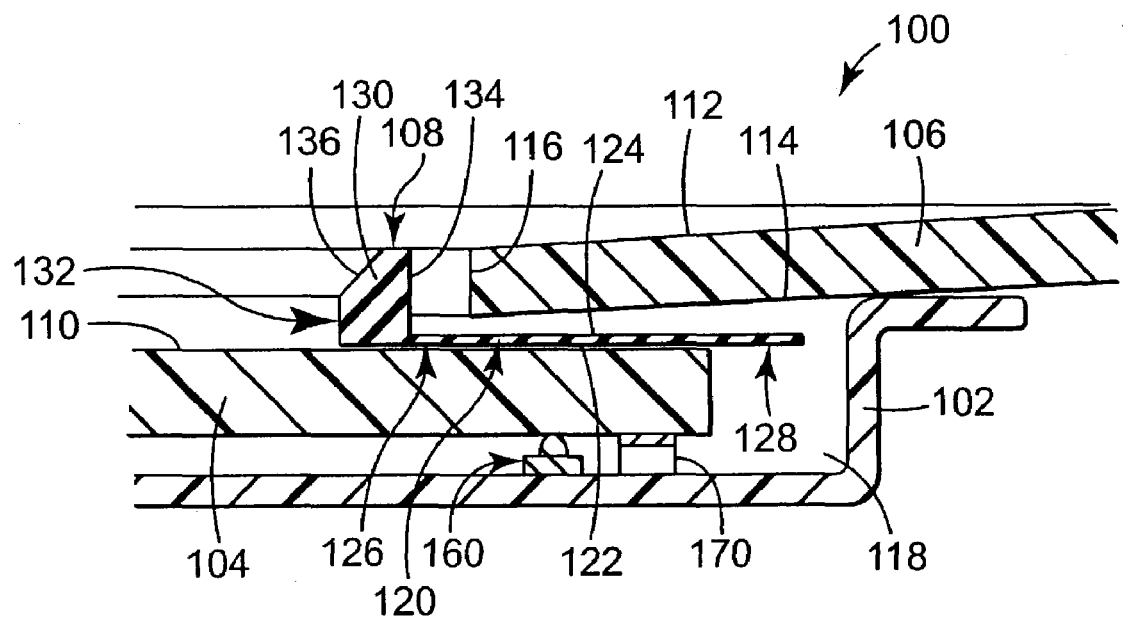
FIG. 2 is a cross-sectional view taken along line 2-2 of the display assembly shown in FIG. 1.
Figure 3:
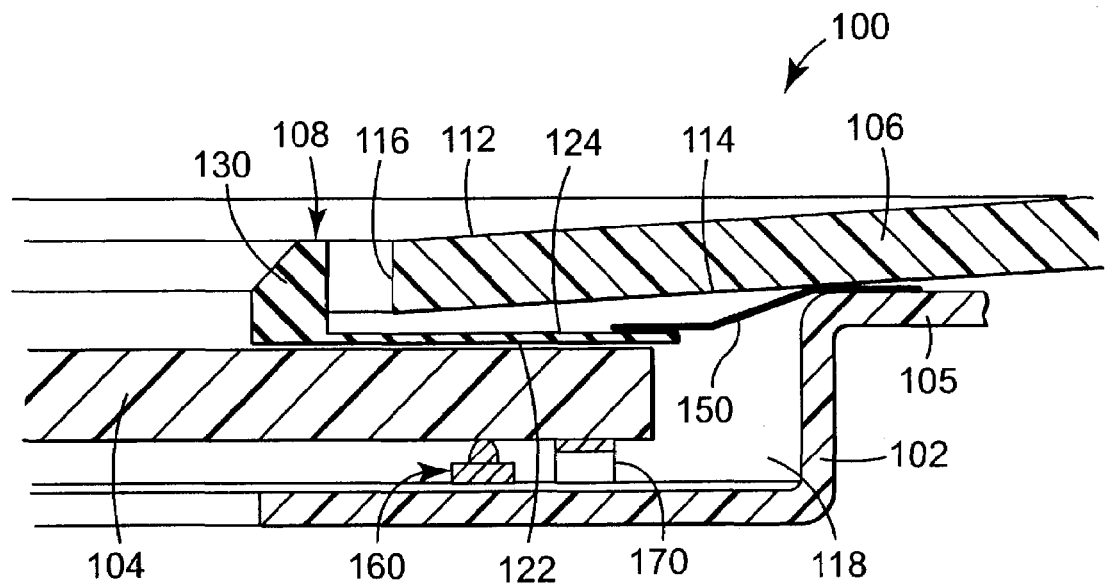
FIG. 3 is a cross-sectional view of the display assembly shown in FIG. 1 that further includes a flexible sealing member.
Figure 4:
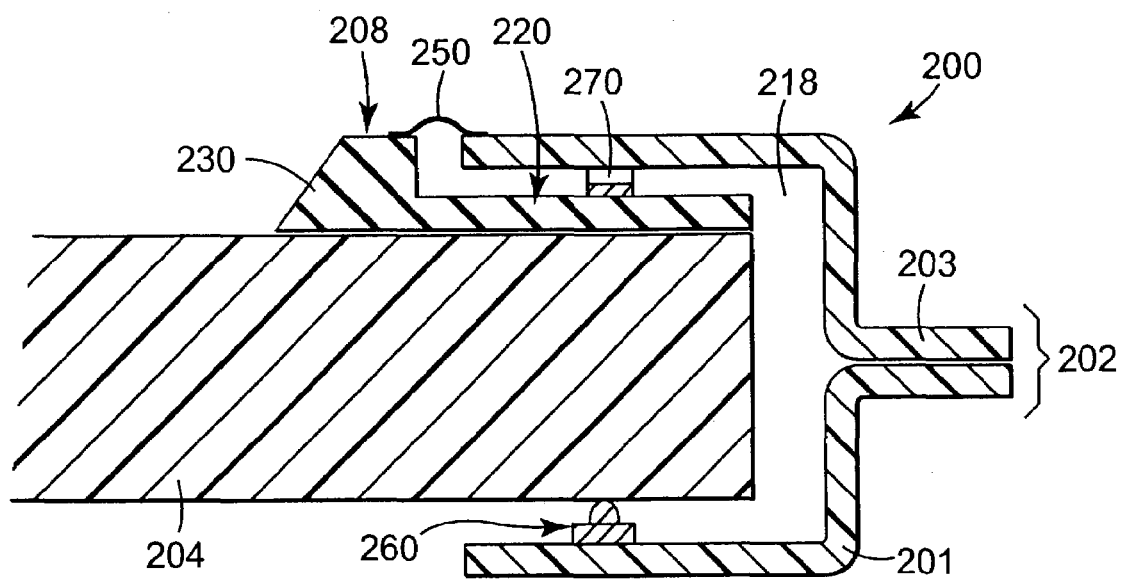
FIG. 4 is a cross-sectional view of a second exemplary display assembly having a display screen seal according to principles of the invention, and a flexible sealing member.
Figure 5:
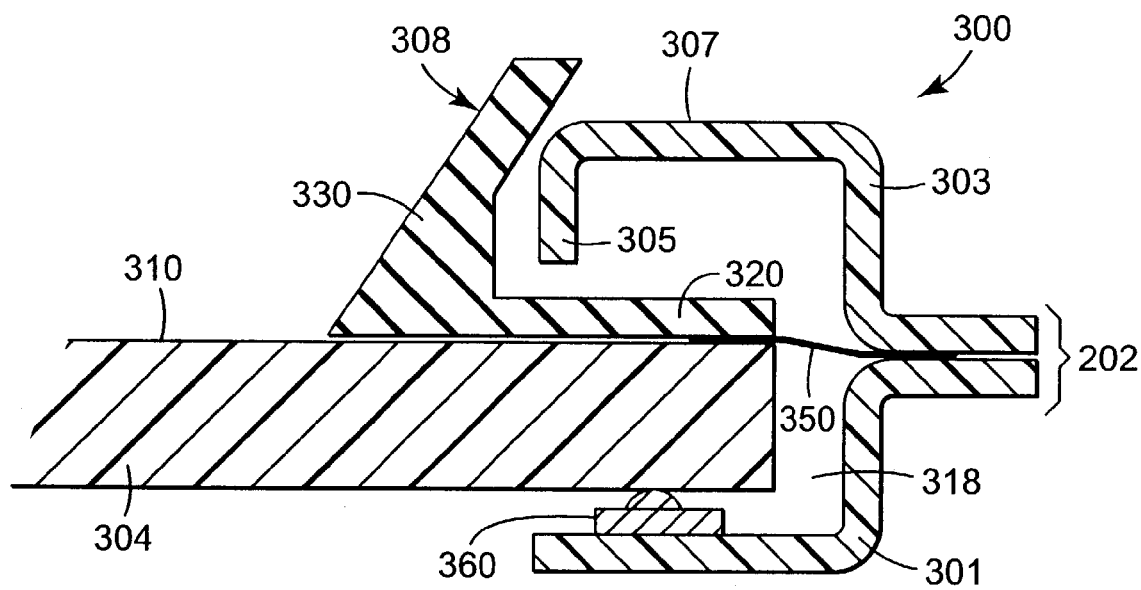
FIG. 5 is a cross-sectional view of a third exemplary display assembly having a display screen seal and a flexible sealing member, according to principles of the invention.
Figure 6:
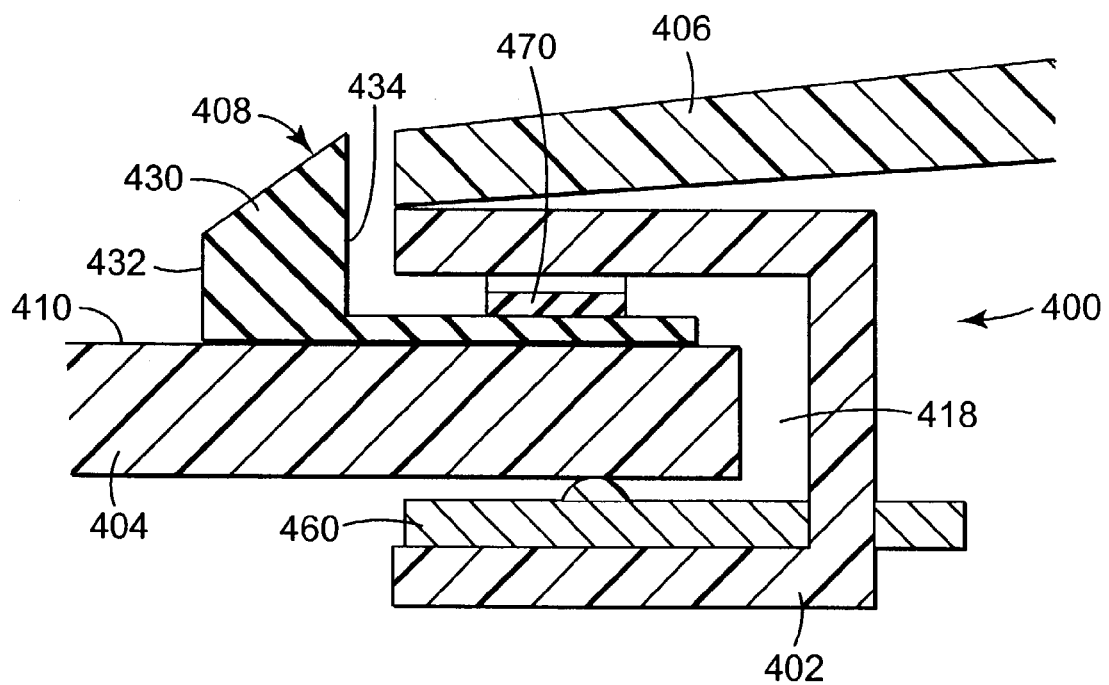
FIG. 6 is a cross-sectional view of a fourth exemplary display assembly having a display screen seal according to principles of the invention, and further including a bezel structure.

FIGS. 2, 3 and 6 illustrate several embodiments of a display assembly that may be taken from the indicated cross-section of display 100 illustrated in FIG. 1. FIGS. 4 and 5 illustrate embodiments of a display assembly that does not include a bezel. As discussed herein, most display assemblies include other components such as transducer 160, pre-load spring 170, and other connecting features and electronics that may require a clean environment and may be housed within an interior space 118 between the housing (such as a bezel or a frame) and the screen.

Wall seal 108 of assembly 100 includes a base 120 having first and second surfaces 122, 124 and first and second sides 126, 128. Wall seal 108 also includes a wall portion 130 that is secured at first side 126 and preferably extends from second surface 124. When first surface 122 is in contact with top surface 110 of screen 104, wall portion 130 extends generally away from outer surface 110 of screen 104, and includes an inward facing side 132 and an outward facing side 134. Inward facing side 132 may include a chamfered edge 136 that provides a transition surface between screen 104 and bezel 106. Wall seal 108, when mounted to top surface 110 of screen 104, is capable of inhibiting the passage of foreign objects, such as dust and liquids, from moving along surface 110 and entering between bezel 106 and surface 110 into interior space 118. Because separation between the screen and the frame or bezel is typically required for force touch systems, wall portion 130 is spaced apart from bezel 106, thus reducing the likelihood that wall seal 108 will inhibit all foreign objects from entering between end surface 116 of bezel 106 and outward facing surface 134 of wall portion 130.

One way to provide further sealing of interior space 118 is to add a flexible membrane 150 that extends from wall seal 108 to the assembly housing (such as bezel 106 or frame 102), as shown in FIG. 3. Flexible membrane 150 is preferably secured to either the first or second surfaces of the wall seal base or the wall portion of the wall seal, and extends and is attached to a portion of the assembly frame or bezel. In the embodiment of FIG. 3, frame 102 includes a flange 105 that supports bezel 106 and provides a laterally extending surface upon which flexible membrane 150 may be secured. Flexible membrane 150 may, in other embodiments, be secured to other portions of frame 102, or may be secured to the outer, inner or end surfaces 112, 114, 116, respectively, of bezel 106. Thus, according to the configuration of FIG. 3, wall seal 108 may be useful in inhibiting a majority of any foreign objects that are near screen 104 from entering interior space 118, while flexible membrane 150 may provide an additional seal to keep any addition foreign objects, such as dust, moisture or other contaminants, from entering interior space 118.

FIG. 4 illustrates a second display embodiment 200 in which the frame 202 of the display includes first and second portions 201, 203. First and second portions 201, 203 may create a C-shaped frame that, in some configurations, provides support and rigidity necessary for a force-based touch system. A two-piece frame may also be advantageous for the purposes of assembling display 200. Frame portion 203 may act as a structure that is positioned adjacent to screen 204, to which wall seal 208 may be positioned adjacent to in order to inhibit foreign objects from entering into an interior space 218 of display 200. Device 200 may also include a biasing member 270 that is positioned between frame 202 and screen 204 to bias screen 204 against transducer 260.

Display 200 may also include an optional flexible membrane 250 that extends between wall portion 230 of wall seal 208 and frame portion 203. Thus, the combination of a wall seal 208 secured to screen 204 and a flexible membrane 250 that extends between wall seal 208 and frame 202, may improve sealing of internal space 218 from any contaminants or foreign objects near screen 204.

A yet further display embodiment 300, having a modified frame portion 303 and wall portion 330, is shown in FIG. 5. Display 300 includes a frame 302 with first and second frame portions 301, 303, a screen 304, a wall seal 308 having a wall portion 330 and a base 320, a flexible membrane 350, and a transducer 360. Second frame portion 303 includes a further protrusion 305 that extends toward a top surface 310 of screen 304. Protrusion 305 may extend in a variety of different directions and have differing shapes than the shape shown to optimize the spacing between wall seal 308 and second frame portion 303 so as to permit sufficient movement of screen 304 to obtain a proper force touch reading. The shape of protrusion 305 may also be useful for inhibiting foreign objects from entering into an internal space 318.

Wall portion 330 may be configured to extend adjacent to an outer surface 307 of second frame portion 303. By extending adjacent to surface 307, or in some embodiments above second frame portion 303, wall portion 330 may more effectively inhibit passage of foreign objects between frame 302 and an outer surface 310 of screen 304.

Flexible membrane 350 is shown as being attached at one of its sides to base 320 and top surface 310 of screen 304, and secured at another side to the first and second frame portions 301, 303. As with the embodiment illustrated in FIG. 3, flexible membrane 350 may be secured to wall seal 308, screen 304, or various portions of first and second frame portions 301, 303 to simplify assembly of display 300 and improve sealing of internal space 318.

A yet further display embodiment 400 is illustrated in FIG. 6. Display 400 includes a frame 402, a screen 404, a bezel 406, a wall seal 408, a transducer 460 and a biasing member 470. Frame 402 has a C-shaped frame that provides sufficient structure and rigidity to support screen 404 and transducer 460. Wall seal 408 is mounted to a top surface 410 of screen 404 and includes a wall portion 430 that extends in a direction away from screen 404 to inhibit foreign objects from entering into an internal space 418 within device 400. Device 400 may also include a biasing member 470 that is positioned between frame 402 and screen 404 to bias screen 404 against transducer 460. In this particular embodiment, spring 470 engages wall seal 408, but may, in other embodiments, contact only surface 410 and frame 402.

As shown in FIG. 6, wall portion 430 of wall seal 408 may extend away from screen 404, beyond frame 402, to provide a transition surface between screen 404 and bezel 406. Also, wall portion 430 may be relatively thin between inwardly and outwardly facing surfaces 432, 434 so that wall seal 408 occupies a minimum amount of a viewable area of screen 404. Thus, the width of wall portion 430 may directly correlate to the ratio of a viewable screen width (for example, see width H in FIG. 1) to the overall width of the display (for example, see width W in FIG. 1).

The wall seal of the present invention may be made of a variety of different rigid or semi-rigid materials such as, for example, polymers, rubber, composites, metals, metal alloys, or any other material with sufficient rigidity when provided in its desired size and shape to maintain a wall structure.

The wall seal of the present invention may also have various shapes and configurations. For example, a wall seal may be limited to a wall portion only (such as the wall portion 108 described above) without a base member that extends between the screen and a structure adjacent to the screen. Such a configuration may be more difficult to secure to the screen but would allow for a thinner display due to a less space required between the screen (such as screen 104) and the adjacent structure (such as bezel 106 shown in FIG. 2).

The flexible membrane discussed above can provide a lateral stiffening effect for a display of the present invention. A flexible membrane that is composed of a material of relatively high modulus may be resistant to tangential movement of the touch screen (motion in a plane of the touch surface of the screen), yet pliable for vertical movement of the screen (in a direction normal to the top surface of the screen) that is essential for a force touch system. The flexible membrane may be made to bulge, or curve, somewhat above and/or below the outer surface of the screen, thus increasing its vertical range of compliance. Such curvature also has the effect of restricting the lateral stiffening to the sides parallel to a tangential force applied to the screen, where it is transmitted through the flexible membrane as shear, rather than compression or extension forces. The flexible membrane need not be continuous in order to provide the lateral stiffening characteristics, but is preferably continuous in order to provide a reliable seal around the entire periphery of the screen.

Although each of the membrane configurations 150, 250, 350 may provide certain advantages, each design is intended to provide the required seal for a particular design without exerting forces above a threshold amount that would cause inaccurate determinations of touch locations on a touch surface of the screen. In this context, a threshold amount of force is the minimum amount of force applied to the screen that is required in order for the force to be recognized by the sensor assembly. Threshold can be adjusted, for example, to suit the environment or intended application. Threshold can be automatically adjusted based on use history. In order for a sensor assembly of the present invention to work as desired, the screen (or other touch sensitive structure) should be isolated from the influence of any force being transmitted to the sensors above the threshold amount, except for intended touch inputs.

Typically, a threshold is based on a mathematical algorithm that takes into consideration all forces applied to the sensor, including the amount and the direction in which the forces are applied to the sensor. A processor may be used to make the required calculations to determine if the input forces exceed threshold values. Ultimately, threshold values are used in part to distinguish between "noise" forces (forces not intended as a touch input) and intended touch inputs.

One exemplary sensor assembly has a threshold of about four ounces. As a result, it is desired that the membrane not impose or transmit forces less than a total of four ounces applied locally to the display screen at any given time, even when extraneous forces are applied to a device in which the sensor assembly is mounted. Preferably, the membrane of a sensor assembly is designed to exert far less than the minimum recognized force applied to the display screen under any conditions. Most preferably, the membrane applies a force at least one order of magnitude less than the threshold force. In some applications, depending on the membrane configuration and material characteristics, the membrane imposes a force on the touch sensitive structure of $1/50$, $1/100$ or less of the threshold value.

Even if the membrane applies forces below that of the threshold amount, a non-uniform distribution of forces from the membrane around the periphery of the touch sensitive display screen may skew a touch location determination. Non-uniform distribution of membrane forces may be particularly evident when using strips of compliant material, such as foam-like material, as a seal and there is any non-uniformity in the gap between the housing and the screen. Additionally, even if it were possible to maintain a perfectly uniform gap between the screen and the housing and a uniform force from the membrane to the screen around its periphery, a touch force applied to the screen deflects the screen causing a natural biasing force to arise.

The properties and configurations of various examples of flexible membranes that may be used in conjunction with wall seal embodiments disclosed herein are shown and described in co-pending U.S. application Ser. No. 10/365,654, which is incorporated herein by reference in its entirety.

Portions of the display assemblies disclosed herein may be pre-assembled as a self-contained sensor assembly that is capable of being assembled and tested separately from the display device to which it is mounted. If desired, at a later time, an end user may mount the self-contained sensor assembly to a display device.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A display screen seal, comprising:
a base having first and second surfaces and first and second sides, the first surface configured for engaging a display screen, and the second surface facing in a direction away from the display screen;
a wall portion extending from the second surface and configured for inhibiting foreign objects from passing between the screen and a frame of the display positioned adjacent the second surface of the base; and
a flexible seal that extends between the wall portion and the frame.

2. The seal of claim 1, wherein the first side of the base faces in a direction toward a center of the display screen, wherein the wall portion is positioned at the first side of the base.

3. The seal of claim 1, wherein the frame is C-shaped.

4. The seal of claim 1, wherein the frame comprises first and second portions capable of being secured to each other at a connection point to form a generally C-shaped structure, the first portion extending adjacent the second surface of the base.

5. The seal of claim 4, further comprising a flexible seal tat extends between the base and the connection point between the first and second portions of the frame.

6. The seal of claim 1, wherein the first side of the base faces in a direction toward a center of die display screen, wherein the wall portion is positioned at the first side of the base.

7. The seal of claim 1, wherein the first side of the base faces in a direction toward a center of the display screen, wherein the wall portion is positioned at the first side of the base.

8. The assembly of claim 7, wherein the wall seal is made of a rigid or semi-rigid material.

9. A method of inhibiting foreign objects from entering between a touch sensitive surface of a display screen and a structure positioned adjacent the touch sensitive surface, comprising:
providing a wall seal having a base with opposing first and second surfaces, and having a wall portion extending from the second surface, and providing a sealing membrane;
positioning the second surface of the base between the structure and the touch sensitive surface;
positioning the wall portion adjacent the structure;
securing the first surface of the base to the touch sensitive surface to inhibit foreign objects from passing along a plane of the touch screen between the display screen and the structure; and
extending the scaling membrane between the wall portion and the structure.

10. The method of claim 9, wherein die securing step includes securing the base around a periphery of the display screen.

11. The method of claim 9, wherein the positioning the wall portion step includes spacing the wall portion apart from the structure.

12. The method of claim 9, wherein the wall seal extends around a periphery of the display screen, and the sealing membrane and wall seal from a complete liquid and particle seal between the touch sensitive surface of the display surface and the structure.

13. A force-based touch sensor assembly comprising a frame, a screen having inner and outer surfaces, a wall seal for inhibiting passage between the frame and the screen, a force activated transducer positioned adjacent the screen for detecting forces pushing through the screen due to a touch input, and a flexible membrane capable of extending between the wall portion and the frame, the wall seal comprising:
a base having first and second surfaces and first and second sides, the first surface capable of being mounted to the screen; and
a wall portion extending from the second surface in a direction away from the screen;
whereby the wall seal is configured and arranged so that mounting the wall seal to the screen with the wall portion positioned adjacent the frame inhibits passage of objects between the frame and the screen.

14. The assembly of claim 13, wherein the frame and the screen include outer and inner surfaces, and the base is capable of being positioned between the inner surface of the frame and an outer surface of the screen.

15. The assembly of claim 13, wherein the wall seal is configured to extend around a circumference of the screen.

16. The assembly of claim 15, wherein the wall seal is a continuous, uninterrupted piece.

17. The assembly of claim 13, wherein the wall seal is made of a rigid or semi-rigid material.

18. The assembly of claim 13, wherein the frame comprises outer and inner surfaces, and the wall portion is capable of extending above the outer surface of the frame.

19. The assembly of claim 13, wherein the display further comprises a bezel, and the wall portion is capable of extending adjacent to the bezel thereby inhibiting passage of objects between the bezel and the screen.

20. A self-contained force-based touch sensor assembly, comprising;
a frame having inner and outer surfaces;
a screen having inner and outer surfaces;

a transducer positioned to sense forces passing through the screen due to touch inputs on the screen;

a spring positioned between the inner surface of the frame and the screen to exert a preload force between the screen and the transducer;

a wall seal having a base with first and second surfaces and a wall portion extending from the second surface, the first surface of the base being mounted to the outer surface of the screen and positioned between the inner surface of the frame and the outer surface of the screen, and the wall portion being positioned adjacent the frame; and a flexible membrane extending from the wall portion to the frame, the wall seal and flexible membrane capable of forming a complete seal between the frame and the screen.

21. The assembly of claim 20, wherein the flexible membrane is a single molded piece.

22. The assembly of claim 20, wherein the wall seal is a single molded piece.

23. The assembly of claim 20, wherein the wall portion includes a chamfered edge.

24. The assembly of claim 20, wherein the wall seal if-made-of comprises a rigid or semi-rigid material.

25. The assembly of claim 20, wherein the a wall portion includes an inner surface positioned adjacent to the frame and an outer surface facing away from the frame.

26. A display screen seal, comprising:

a base having first and second surfaces and first and second sides, the first surface configured for engaging a display screen, and the second surface facing in a direction away from the display screen;

a wall portion extending from the second surface and configured for inhibiting foreign objects from passing between the screen and a frame of the display positioned adjacent the second surface of the base, wherein the frame comprises first and second portions capable of being secured to each other at a connection point to form a generally C-shaped structure, the first portion extending adjacent the second surface of the base; and a flexible seal that extends between the base and the connection point between the first and second portions of the frame.

27. A display screen seal, comprising:

a base having first and second surfaces and first and second sides, the first surface configured for engaging a display screen, and the second surface facing in a direction away from the display screen;

a wall portion extending from the second surface and configured for inhibiting foreign objects from passing between the screen and a bezel positioned adjacent the second surface of the base; and a sealing membrane that extends between the wall portion and the bezel.

28. A force-based touch sensor assembly comprising a frame, a bezel, a flexible member, a screen having inner and outer surfaces, a wall seal for inhibiting passage between the frame and the screen, and a force activated transducer positioned adjacent the screen for detecting forces pushing through the screen due to a touch input, the wall seal comprising:

a base having first and second surfaces and first and second sides, the first surface capable of being mounted to the screen;

a wall portion extending from the second surface in a direction away from the screen;

whereby the wall seal is configured and arranged so that mounting the wall seal to the screen with the wall portion positioned adjacent the frame inhibits passage of objects between the frame and the screen, the wall portion is capable of extending adjacent to the bezel thereby inhibiting passage of objects between the bezel and the screen, and the flexible membrane is capable of extending between the wall portion and the bezel.

29. The assembly of claim 28, wherein the frame and the screen include outer and inner surfaces, and the base is capable of being positioned between the inner surface of the frame and an outer surface of the screen.

30. The assembly of claim 28, wherein the wall seal is configured to extend around a circumference of the screen.

31. The assembly of claim 30, wherein the wall seal is a continuous, uninterrupted piece.

32. The assembly of claim 28, wherein the frame comprises outer and inner surfaces, and the wall portion is capable of extending above the outer surface of the frame.

* * * * *

UNITED STATES PATENT AND TRADEMARK OFFICE
CERTIFICATE OF CORRECTION

PATENT NO. : 7,109,976 B2
APPLICATION NO. : 10/404465
DATED : September 19, 2006
INVENTOR(S) : Paul J. Cobian It is certified that error appears in the above-identified patent and that said Letters Patent is hereby corrected as shown below:

In Col. 2, line 13, delete "structure ,and" and insert -- structure, and --.

In Col. 7, line 56, in Claim 5, delete "tat" and insert -- that --.

In Col. 7, line 59, in Claim 6, delete "die" and insert -- the --.

In Col. 8, line 18, in Claim 10, delete "die" and insert -- the --.

In Col. 8, line 26, in Claim 12, delete "from" and insert -- form --.

In Col. 9, line 24, in Claim 24, delete "if-made-of" before "comprises".

In Col. 9, line 25, in Claim 25, delete "a" before "wall".

Signed and Sealed this

Ninth Day of January, 2007

JON W. DUDAS
*Director of the United States Patent and Trademark Office*